United States Patent [19]

Chapman

[11] Patent Number: 5,074,124

[45] Date of Patent: Dec. 24, 1991

[54] COOLED AIR ENVIRONMENT FOR AIR CONDITIONERS

[76] Inventor: John Chapman, 2035 W. Marlette, Phoenix, Ariz. 85015

[21] Appl. No.: 572,031

[22] Filed: Aug. 23, 1990

[51] Int. Cl.$^5$ .............................................. F28D 5/00
[52] U.S. Cl. .............................. 62/305; 62/DIG. 16; 261/152
[58] Field of Search ................ 62/304, 305, 507, 311, 62/62, DIG. 16; 261/152 X

[56] References Cited

U.S. PATENT DOCUMENTS 2,069,150  1/1937  Holder .................................. 62/304
4,242,876  1/1981  Cooper et al. ................. 62/DIG. 16

*Primary Examiner*—Albert J. Makay
*Assistant Examiner*—John Sollecito
*Attorney, Agent, or Firm*—James F. Duffy

[57] ABSTRACT

The apparatus for creating a reduced temperature air surround about a refrigeration type air conditioner. The reduced temperature air surround is interposed between the air conditioner and the environment, ambient temperature air surround. The apparatus for creating the reduced temperature air surround is a water cooling system having mist-spray heads for ejecting a fine particulate water mist into the air surrounding the air conditioner. A valve actuates the mist-spray heads only at those times at which the air conditioner fan is actuated to draw air from the immediate vicinity of the air conditioner and pass that air over the condenser coils of the air conditioner.

5 Claims, 1 Drawing Sheet

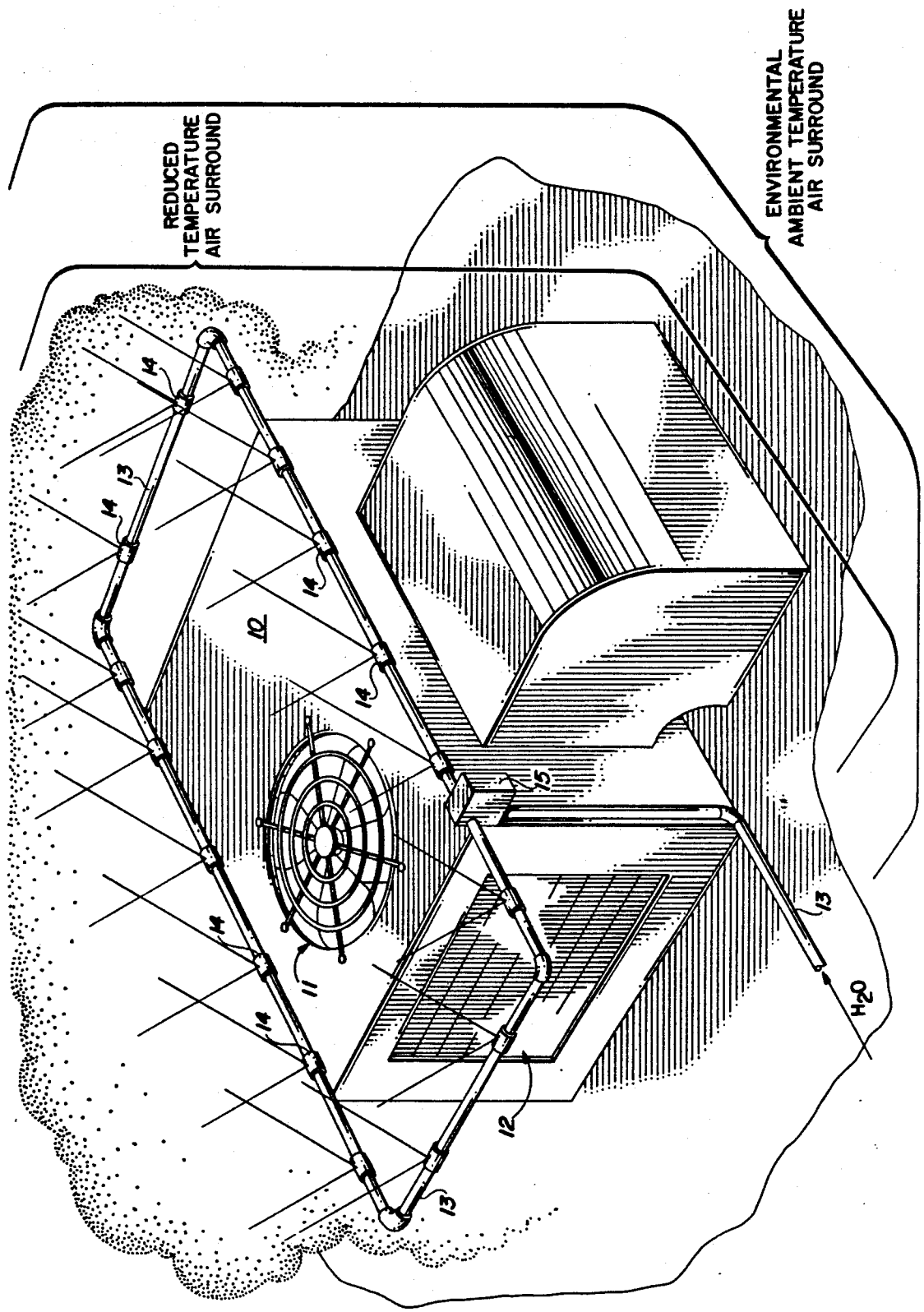

COOLED AIR ENVIRONMENT FOR AIR CONDITIONERS

BACKGROUND

1. Field of the Invention

The invention relates to apparatus for cooling the environment immediately adjacent to a refrigeration type air conditioner.

2. Prior Art

The prior art is replete with methods for utilizing water to achieve a cooling effect. In addition to the well known evaporative cooling systems, much of the prior art is devoted to the direct application of water to the roof of a building. Such roof wetting techniques are espoused by the inventors in the following United States patents.

| Crawford-Frost | 964,464 |
| Murray | 2,506,936 |
| Valient | 4,175,703 |
| Smith | 4,372,493 |

To reduce the workload on refrigeration type air conditioners when the environmental air ambient temperatures are high, many inventors support the concept of spraying water directly upon the condenser coils of the air conditioner. Typical examples of such teaching will be found in the following United States patents.

| DiTucci | 3,613,392 |
| Barry | 4,193,269 |
| Faxon | 4,240,265 |
| Shires | 4,274,266 |
| Essex | 4,290,274 |

Certainly, maintaining the roof or a residence in a wet state is wasteful of a natural resource which grows scarcer annually. Further, constant wetting of the roof tends to adversely affect the useful lifetime of the roofing surface.

Spraying water on the condenser coils of a refrigeration type air conditioning unit is initially an effective way of reducing the load on the air conditioner during conditions of extreme environmental heat. However, as mineral deposits build up on the condenser coil cooling fins, the cooling efficiency of the condenser system is degraded and the energy required to achieve useful cooling by the air conditioner increases with a commitant increase in the cost of operation of the air conditioner.

It is an objective of the present invention to provide means for reducing the load on a refrigeration type air conditioner without adversely affecting the immediate building premises, without wastefully using water, and without building up an insulative coating of mineral deposits on the heat transfer surfaces of the condenser coils of the air conditioner.

SUMMARY OF THE INVENTION

The invention is disclosed and claimed as an improvement in a refrigeration air conditioner which air conditioner is emplaced in an environmental air surround so as to draw air from the air surround at ambient temperature and to pass the drawn air over refrigerant condenser coils to reduce the temperature of the refrigerant within the condenser coils. The improvement is disclosed and claimed as pre-cooling means coupled to the environmental air surround for reducing the temperature of the environmental air surround. The entire air conditioner thus resides in a reduced temperature air surround; and, the air conditioner draws in air at the reduced temperature.

In a presently preferred embodiment of the invention, the pre-cooling means comprises water misting means for injecting a fine particulate mist into the environmental air surround.

The air conditioner has an intermittently energized fan to intermittently draw air across the refrigerant condenser coils. A valve is coupled to the pre-cooling means such that the valve is actuated upon energization of the fan. The action of the valve is such that the water misting means intermittently injects a fine particulate mist into the environmental air surround as the fan is intermittently energized.

Another way of describing the invention would be as an improved air conditioning system comprising a refrigeration air conditioner; a first body of air at environmental, ambient temperature surrounding the air conditioner; a mist-spray air cooling means coupled to the first body of air; and a second body of air at a temperature cooled below the environmental, ambient temperature by action of this mist-spray air cooling means. The second body of air is adjacent to the air conditioner and interposed between the air conditioner and the first body of air. By cooling the air immediately surrounding the air conditioner, the air conditioner does not suffer from extreme loading when the environmental temperatures rise. The entire air conditioner is maintained immersed in a reduced temperature air surround; and, the water mist, which evaporates within the air surround, does not deposit a mineral coating to form an insulating layer on the condenser fins.

DETAILS OF THE DRAWING

The sole FIGURE illustrates a refrigerator type air conditioner immersed in a reduced temperature air surround produced by a water mist-spray system. The reduced temperature air surround lies adjacent to the air conditioner and is interposed between the air conditioner and the environmental, ambient temperature, air surround.

A DETAILED DESCRIPTION OF THE INVENTION

For purposes of promoting an understanding of the principles of the invention, reference will now be made to the embodiments illustrated in the drawings and specific language will be used to describe same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

With reference to the FIGURE, a refrigeration type air conditioner 10 is equipped with a fan 11 which draws air across condenser coils 12. Piping 13 is connected to a source of water, not shown, and conducts water through a valve 15 to a plurality of mist-spray heads 14. Water spraying from spray heads 14 produces a reduced temperature air surround immediately adjacent to air conditioner 10. This reduced temperature air surround is interposed between air conditioner 10 and the environmental, ambient temperature, air surround.

When fan 11 draws air in from the reduced temperature air surround so as to cause reduced temperature air to pass across condenser coils 12, air conditioner 10 operates under a lesser load than it would experience if the temperature of the air passing across condenser coils 12 were at the environmental air ambient temperature. Because spray heads 14 eject a fine particulate water mist, evaporation occurs within the reduced temperature air surround, which reduced temperature air surround is created by the evaporation of the mist within that air surround. Since evaporation of the water particulates takes place within that air surround, no deposit of water dissolved minerals takes place on the condenser coils, therefore, no insulating layer of minerals builds upon the condenser coils and the air conditioner's efficiency is not impaired. Rather, the effect of drawing in pre-cooled air lessens the load on air conditioner 10 and thereby effectively increases the efficiency of operation of air conditioner 10.

An advantage of utilizing mist-spray heads 14 is that a very little volume of water is disbursed while achieving a significant decrease in air temperature. To further decrease the amount of water used, valve 15 is placed within the feed path of the water flowing through piping 13. In a presently preferred embodiment of the invention, valve 15 is actuated to permit water to flow through piping 13 to mist-spray heads 14 only when fan 11 is actuated to draw air across condenser coils 12. Valve 15 cuts off the flow of water when fan 11 is de-energized. To achieve the simultaneous but intermittent operation of fan 11 and valve 15, valve 15 may be an electrically actuated valve which is energized only at those times in which fan 11 is energized. Alternatively, valve 15 may be actuated by the air flow created by the energization of fan 11. Such air flow actuated valves are well known in the art.

What has been described is the apparatus for creating a reduced temperature air surround about a refrigeration type air conditioner. The reduced temperature air surround is interposed between the air conditioner and the environmental, ambient temperature air surround. The apparatus for creating the reduced temperature air surround is a water cooling system having mist-spray heads for ejecting a fine particulate water mist into the air surrounding the air conditioner. A valve actuates the mist-spray heads only at those times at which the air conditioner fan is actuated to draw air from the immediate vicinity of the air conditioner and pass that air over the condenser coils of the air conditioner.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such a clear and concise manner that those skilled in the art may readily understand and practice the invention, that which is claimed is:

1. In a refrigeration air conditioner emplaced in an environmental air surround to draw air from said air surround at ambient temperature and to pass said drawn air over refrigerant condenser coils to reduce the temperature of refrigerant within said condenser coils, the improvement comprising:
pre-cooling means coupled to said environmental air surround and operatively coupled to said refrigeration air conditioner for reducing the temperature of said environmental air surround such that the entire air conditioner resides in a reduced temperature air surround and said air conditioner draws in air from said reduced temperature air surround.

2. The improvement of claim 1 wherein said pre-cooling means comprises water misting means for injecting a fine particulate mist into said environmental air surround.

3. The improvement of claim 2 wherein said air conditioner further comprises an intermittently energized fan for intermittently drawing air across said refrigerant condenser coils and said pre-cooling means includes a valve actuated by energization of said fan, whereby said water misting means intermittently injects a fine particulate mist into said environmental air surround as said fan is intermittently energized.

4. An improved air conditioning system comprising:
a refrigeration air conditioner;
a first body of air at environmental ambient temperature surrounding said air conditioner;
mist-spray air cooling means coupled to said first body of air and operatively coupled to said refrigeration air conditioner; and
a second body of air of temperature cooled below said environmental ambient temperature by action of said mist-spray air cooling means, said second body of air being adjacent said air conditioner and interposed between said air conditioner and said first body of air.

5. In a refrigeration air conditioner emplaced in an environmental air surround to draw air from said air surround at ambient temperature and to pass said air over refrigerant condenser coils to reduce the temperature of refrigerant within said condenser coils, the improvement comprising:
pre-cooling means coupled to said environmental air surround for reducing the temperature of said environmental air surround such that the entire air conditioner resides in a reduced temperature air surround and said air conditioner draws in air from said reduced temperature air surround; said pre-cooling means comprising water misting means for injecting fine particulate mist into said environmental air surround;
said air conditioner further comprising an intermittently energized fan for intermittently drawing air across said refrigerant condenser coils and said pre-cooling means includes a valve actuated by energization of said fan, whereby said water misting means intermittently injects a fine particulate mist into said environmental air surround as said fan is intermittently energized.

* * * * *